Dec. 22, 1970 M. L. JOHNSON 3,549,491
NUCLEAR REACTOR FUEL ELEMENT HOLD-DOWN AND
TIGHTENING MECHANISM
Filed Nov. 21, 1968
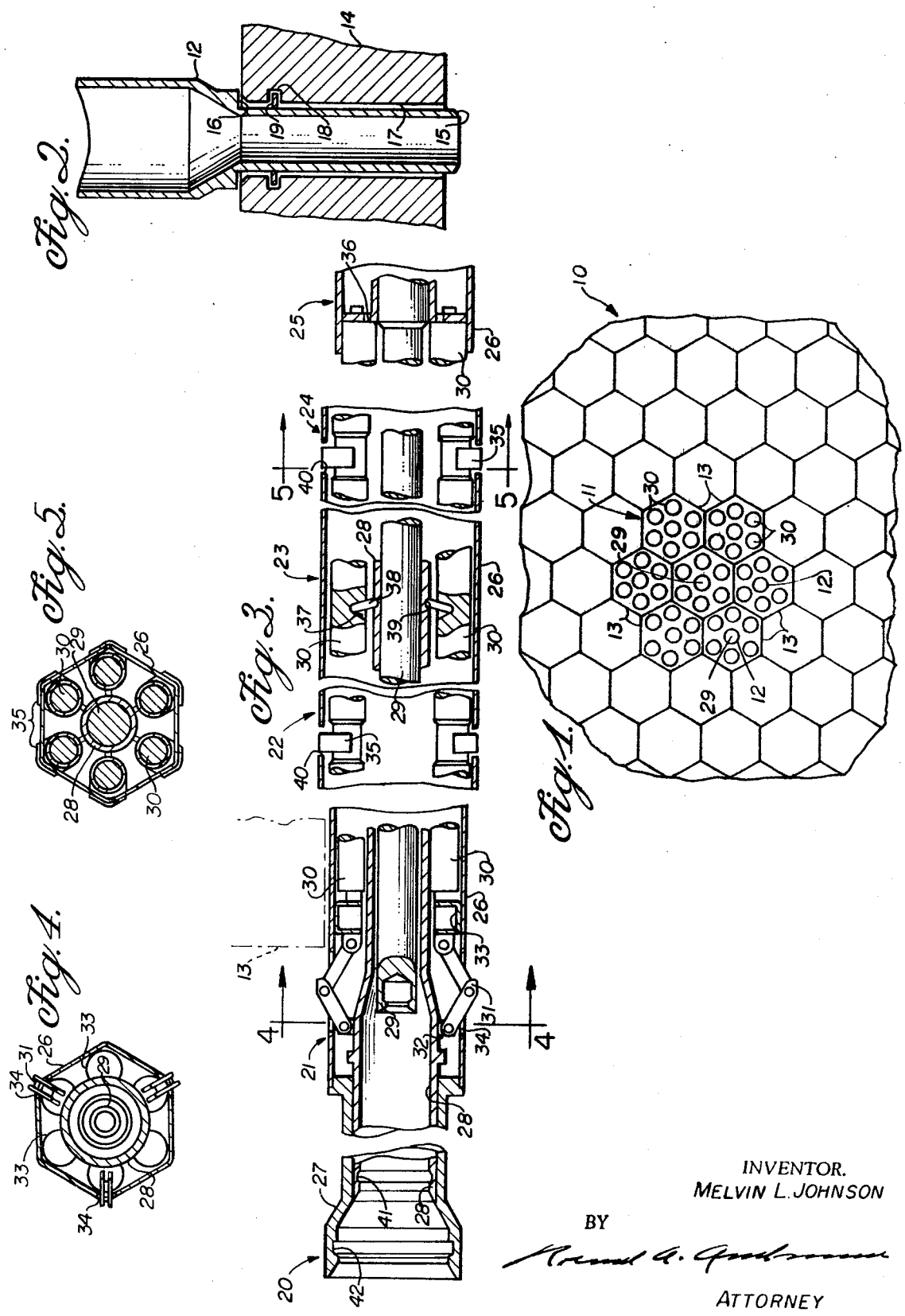
INVENTOR.
MELVIN L. JOHNSON
BY
ATTORNEY United States Patent Office 3,549,491
Patented Dec. 22, 1970

3,549,491
NUCLEAR REACTOR FUEL ELEMENT HOLD-DOWN AND TIGHTENING MECHANISM
Melvin L. Johnson, Fayetteville, Ark., assignor to the United States of America as represented by the United States Atomic Energy Commission
Filed Nov. 21, 1968, Ser. No. 777,793
Int. Cl. G21c 3/14
U.S. Cl. 176—87                          8 Claims

ABSTRACT OF THE DISCLOSURE

A positive means for preventing the hydraulic forces of liquid coolant from lifting fuel elements from their intended location in the core of a nuclear reactor, and to prevent disturbances of the core neutronics by preventing lateral motion or vibration of the fuel elements. This is accomplished by a bayonet lock which holds down a central fuel element of a cluster of elements, by mechanically activated pads which load the central element outward against the adjacent elements to prevent lateral motion, and by retractable arms which extend over the adjacent elements to prevent their upward movement.

BACKGROUND OF THE INVENTION

The invention described herein was made in the course of, or under, Contract No. AT(04–3)–189, Project Agreement No. 47, with the United States Atomic Energy Commission.

This invention relates to hold-down and tightening mechanism for fuel elements in a nuclear reactor, and more particularly to such a mechanism which utilizes a central element of a fuel element cluster to prevent lateral motion and upward movement of the other fuel elements in the cluster.

Nuclear reactors generally are cooled by a liquid coolant flowing upward through the fuel elements. In order to prevent the hydraulic forces of the coolant from lifting the fuel elements from their intended location in the reactor core, various prior art means have been developed for retaining these elements in place. Also, much effort has, in the past, been directed to developing means to prevent lateral motion or vibration of the fuel elements for preventing disturbances of the core neutronics. U.S. Pat. No. 2,983,662 to Shillitto et al., and U.S. Pat. No. 3,060,111 to Sherman et al. are exemplary of these prior art efforts to solve the above problems. While these and various other approaches have been developed and utilized, disadvantages have been found to exist, as set forth in the following examples:

(1) In prior installations utilizing hydraulic holddown of fuel elements, rods extend downward from the vessel cover or a large plate is installed above the core to limit upward movement of the fuel element. Removal of the large plate is a difficult and time-consuming operation. The rods or plate introduce space and clearance problems in some reactors.

(2) In some prior installations utilizing mechanical fastening of the fuel element to the core support plate, all elements are mechanically held down and an actuator must pass through the fuel region. This actuator takes valuable space and introduces serious fuel removal problems in the event of malfunction.

(3) In some prior installations utilizing mechanical hold-down, all fuel channels or elements attach to the core support plate, and the fuel bundle is loaded into the channel and locked in place. This type of arrangement uses valuable space in the core for non-fuel materials and causes problems of tightening the fuel in the channel. Also, fuel bundles handled in this manner are more susceptible to damage during handling.

(4) In some prior installations, the fuel elements have lateral clearance as installed. Coolant flow-induced motion of the fuel elements in fast reactors causes fluctuations of the reactor power. In other reactors having lateral support, the entire core is clamped from the outside of the core. Actuating the clamps is a difficult and time-consuming operation.

(5) In another prior reactor installation using the principle of fuel element clusters, lateral support is provided by bowing the outer elements of the cluster. This arrangement does not have the desired installation clearances for the fuel elements, and thus results in requiring higher installation forces.

SUMMARY OF THE INVENTION

The present invention overcomes the disadvantages of the prior art efforts as set forth above, in that the inventive mechanism uses: (1) mechanical attachment to the core support plate of only one element of a cluster, and permits a rotating motion of the entire element to provide latching; (2) the core is tightened laterally by mechanical means on the central element using the same grapple that is used for fuel removal; and (3) provides a retractable linkage on the central element which is positioned over the adjacent fuel elements for hold-down against hydraulic forces of the coolant.

Therefore, it is an object of this invention to provide a hold-down and tightening mechanism for fuel elements in a nuclear reactor.

A further object of the invention is to provide a central fuel element of a fuel element cluster with hold-down and tightening mechanism for the adjacent fuel elements in the cluster.

Another object of the invention is to provide a fuel element cluster wherein only the central fuel element of the cluster is secured to associated support structure and is provided with means for preventing lateral motion and upward movement of the other elements in the cluster due to the hydraulic forces of the coolant thereabout.

Other objects of the invention will become readily apparent from the following description and accompanying drawings, wherein:

BRIEF DESCRIPTION OF THE DRAWINGS

FIG. 1 illustrates a portion of a cross section of a reactor core, and schematically shows a number of seven-element fuel clusters incorporating the invention;

FIG. 2 is a cross-sectional view illustrating the central fuel element locking installation at the lower end thereof;

FIG. 3 is a view partially in cross-section showing various sections of the upper portion of a fuel element and illustrating an embodiment of the inventive fuel tightener and hold-down mechanism, with portions of the fuel element rotated 30° and enlarged for clarity;

FIG. 4 is a cross-sectional view taken on line 4—4 of FIG. 3, with portions omitted for clarity; and FIG. 5 is a cross-sectional view taken on line 5—5 of FIG. 3.

DECRIPTION OF THE INVENTION

Basically, the present invention is a system combining the following mechanical devices for positioning and fixing fuel elements in the reactor core, and reducing flow-induced vibration of fuel elements:

(1) A bayonet lock to attach the central element of a fuel element cluster (seven in this embodiment) to the core support plate.

(2) A linkage on the central element that is extendable over the top of the six adjacent hydraulically-balanced elements to provide a positive back-up, preventing upward motion in the event the adjacent elements tend to move upward. The linkage is retractable to provide clearance for installing the six adjacent elements.

(3) A linkage on the central element that is extendable throught the walls of the central element to contact the walls of the six adjacent elements, thus eliminating clearance between the elements and reducing flow-induced vibration. The linkage is retractable to provide clearance for installing the six adjacent elements.

FIG. 1 illustrates a portion of a reactor core generally indicated at 10, composed of a plurality of fuel groups or clusters 11, each cluster containing a central fuel element 12 and six adjacent outside fuels elements 13. Each of the fuel elements 12 and 13 are vertical hexagonal tubes which may contain fissionable fuel in the lower end and shielding in the upper end. The hexagonal tubes are arranged in a close-packed array to minimize core volume. If desired, the fuel clusters 11 may provide an ideal arrangement wherein the central element 12 contains a controllable poison rather than fuel. In such a case, only one type of fuel element (elements 13) is required for the reactor; however, the central element 12 may be a special fuel element if the design of core 10 requires it be fuel instead of poison.

In each group or cluster 11 of the seven adjacent fuel elements (the central element 12 and adjacent outside elements 13), the central element 12 is mechanically attached to a core support plate 14, as shown in FIG. 2, and the six adjacent elements 13 utilize hydraulic balance to prevent upward lift due to hydraulic forces. Also, hydraulic balance, as known in the art, may be utilized on the central element 12 to reduce upward forces thereon created by the core coolant. As shown in FIG. 2, the element 12 terminates in a reduced cross-sectional nose piece 15, a shoulder or stop 16 being formed intermediate said nose piece and the normal tube area of the central element. Core support plate 14 is provided with an opening or aperture 17 for insertion of nose piece 15 of each fuel element 12 and 13 utilized; and provided with a pair of grooves 18 located adjacent the upper portion of aperture 17 for each central element 12 and adapted to accept a bayonet type lock or flange 19 on nose piece 15 of central elements 12. While not shown, adjacent each of apertures 17 for the central elements 12 are a pair of vertically extending grooves or cutaway sections extending from the upper surface of core support plate 14 to the grooves 18, which allow the bayonet lock 19 to be inserted into the grooves 18. The grooves 18 extend only partially around the aperture 17 to limit the travel of lock 19 therein.

The central element 12 of each seven-element cluster is installed in the reactor core 10 first, this being done by lowering the element nose piece 15 into aperture or opening 17 of the core support plate 14, as shown in FIG. 2, such that shoulder 16 rests upon the upper surface of plate 14, and the bayonet lock 19 is positioned in grooves 18. The element 12 is then rotated to engage the bayonet lock 19 in grooves 18. When rotated to the limit of travel of lock 19 in grooves 18 the element 12 is properly oriented in the reactor core 10.

The central element 12 contains a grapple-actuated mechanical linkage in the shielding region thereof. The upper end of central fuel element 12, as shown in FIG. 3, is composed of sections indicated as 20, 21, 22, 23, 24 and 25, with sections 22, 23 and 24 being rotated 30° on axis. The central element consists of a hexagonal tube or casing 26, the upper end of which is secured to a fuel handle 27, with the lower end terminating in nose piece 15, as described above, and within which is movably mounted a tightener and hold-down actuator 28, within which is positioned a mechanical drive rod 29 which is secured to element section 25 for purposes not constituting part of this invention. Positioned in spaced relation about actuator 28 are a plurality (six in this embodiment) of rods or tubes 30 (see FIGS. 1, 4 and 5), each of which are secured at their upper end to the hexagonal tube or casing 26. A back-up linkage 31 consists of three linkage assemblies (see FIG. 4). One linkage 31 is shown rotated 30° from true position in section 21. Each back-up linkage 31 is pivotably connected at one end to actuator 28 via a protruding lip 32 thereon, and at the other end to the hexagonal tube or casing 26 via a stiffener rib assembly 33. Tubing or casing 27 is provided with slots 34 adjacent the back-up linkages 31, whereby downward movement of actuator 28 causes the linkages 31 to extend outwardly to a position over the adjacent outer fuel elements 13 of that cluster, as indicated in section 21 in FIG. 3, and as described in greater detail hereinafter. Rods or tubes 30 are each provided with a pair of tightening pads 35, as shown in sections 22 and 24 in FIG. 3, and are secured at the lower end to a support 36 in section 25. Also, each of rods 30 are provided with an angle-shaped cutaway area 37 within which the radially outer surface of a ring-like member 38 is located, the radially inward surface of member 38 being movably secured in a groove 39 in actuator 28 (see section 23 in FIG. 3). Thus, as described in greater detail below, downward movement of actuator 28 additionally causes the ring-like member 38 to force or bow the rods 30 outwardly such that the tightening pads 35 extend through slots 40 in casing or tube 26 and contact the adjacent fuel elements 13, as shown in sections 22 and 24 in FIG. 3, and in FIG. 5.

With the central fuel element 12 secured in the core support plate 14 as described above with respect to FIG. 2, the tightener and hold-down actuator 28 is retracted (moved upwardly toward fuel handle 27) by a grapple (not shown) which locks into a groove 41 on actuator 28 and a groove 42 on handle 27, and moves the actuator 28 upward relative to handle 27. This motion moves the back-up linkage 31 inward from the position shown in FIGS. 3 and 4, and at the same time allows the tightening pads 35 to retract or move inward, due to the upward movement of ring-like member 38, from the position shown in solid lines in section 23 of FIG. 3 to the position indicated thereon by phantom lines of the lower portion of member 38 and the lower rod or tube 30. In this retracted position, clearance is provided for installation of the six adjacent outer fuel elements 13 of a fuel element cluster 11.

After the six adajacent fuel elements 13 are installed, the grapple is actuated to move the fuel tightener and hold-down actuator 28 downward relative to handle 27, which moves the back-up linkage outward over the top of the adjacent fuel elements 13, as shown in FIG. 3, and at the same time moves the tightening pads 35 outward against the adjacent fuel elements 13, as shown in FIG. 3, by bowing the rods or tubes 30 outward due to the movement of member 38 in the cutaway areas 37 of the rods 30. In this position, the fuel elements 13 are secured for reactor operation, and the grapple is then removed from actuator 28 and fuel handle 27.

It is thus seen that the present invention provides a fuel element hold-down and tightening system wherein only one element of a fuel element cluster is directly secured to the reactor core support plate, this being done by a bayonet type locking means; and wherein only the said one element of the cluster is provided with mechanically activated pads which are moved outward against the adjacent elements for reducing disturbances of the core neutronics due to lateral motion or vibration of the fuel elements; and wherein this same element is provided with mechanically retractable arms which extend over the adjacent elements to prevent their upward movement due to the hydraulic forces created by the coolant thereabout.

While a particular embodiment of the invention has been illustrated and described, modifications and changes will become apparent to those skilled in the art, and it is intended to cover in the appended claims all such modifications and changes as come within the spirit and scope of the invention.

I claim:

1. Apparatus for preventing upward movement and lateral motion of a cluster of fuel elements in a nuclear reactor core, due to hydraulic forces thereon by reactor core coolant, comprising: a central fuel element of said cluster being provided in the lower end portion thereof with a bayonet-type lock mechanism adapted to be removably attached to a fixed support structure; and a hold-down and tigthenter mechanism, said hold-down and tightener mechanism including an actuator means movably mounted within a casing of said central fuel element, a plurality of rod-like members mounted in spaced relationship intermediate said actuator means and said casing, each of said rod-like members being provided with at least one pad means, said casing being provided with an opening adjacent each said pad means, force transmitting means interconnecting said actuator means with said rod-like members and adapted to move said rod-like members in a radial direction upon movement of said actuator means, linkage means interconnecting said actuator means and each of said rod-like members, said casing being provided with openings adjacent said linkage means, said linkage means moving in a radial direction upon movement of said actuator means, whereby movement of said actuator means in a direction parallel to and away from lower end portion of said fuel element causes said linkage means and said rod-like members to move radially inward, and movement of said actuator means in a direction parallel to and towards lower end portion of said fuel element causes said linkage means and said rod-like members to move radially outward such that said linkage means extends through said adjacent casing openings and over adjacent fuel elements of an associated cluster, and such that said pad means on said rod-like members extend through said adjacent casing openings for contact with adjacent fuel elements of an associated cluster.

2. The apparatus defined in claim 1, wherein the lower end portion of at least said central fuel element has a smaller cross-sectional area than said casing, said lower end portion being adapted to extend into an aperture in an associated fixed support structure, and wherein said bayonet-type lock mechanism is constructed so as to engage in a groove means of such an associated fixed support structure, such that at least partial rotation of said central element causes same to be secured in an associated fixed support structure.

3. The apparatus defined in claim 1, wherein said linkage means is pivotably connected at one end thereof to said actuator means, and pivotably connected at the other end thereof to said rod-like members via a stiffener rib assembly.

4. The apparatus defined in claim 3, wherein said linkage means comprises a plurality of pairs of pivotably interconnected members, each pair of members being pivotably interconnected between said actuator means and one of said plurality of spaced rod-like members, one member of each pair of linkage means members being constructed to include a portion thereof defining a surface extending substantially parallel with respect to an upper surface of an associated adjacent fuel element.

5. The apparatus defined in claim 1, wherein each of said rod-like members is provided with a cutaway section, and wherein said means for radially moving said rod-like members comprises a ring-like member having a radial outer surface thereof located in said cutaway section of said rod-like members and having a radial inner surface movably mounted on said actuator means.

6. The apparatus as defined in claim 1, wherein said casing is attached to a handle means, and said handle means and said actuator means are each provided with means for attaching an associated grapple means adapted for moving said actuator means relative to said handle means.

7. The apparatus defined in claim 1, wherein the cluster of fuel elements is composed of said central fuel element and six adjacent fuel elements, and wherein said hold-down and tightener mechanism includes separate linkage means and separate pad means for each of said six adajacent fuel elements.

8. The apparatus defined in claim 7, wherein said casing of said central element is hexagonal in cross-section, and wherein each of said six adjacent fuel elements include a hexagonal casing, one flat surface of each adjacent fuel element casing being adjacent a flat surface of said central fuel element casing.

References Cited

UNITED STATES PATENTS

| | | | |
|---|---|---|---|
| 2,983,662 | 5/1961 | Shillitto et al. | 176—30 |
| 3,060,111 | 10/1962 | Sherman et al. | 176—18 |
| 3,163,585 | 12/1964 | Metcalfe et al. | 176—87 |
| 3,164,530 | 1/1965 | Banks | 176—87 |
| 3,295,883 | 1/1967 | Dupuy et al. | 176—30X |
| 3,337,257 | 9/1967 | Brynsvold | 176—30X |
| 3,353,566 | 11/1967 | Cepkauskau et al. | 176—87X |
| 3,388,942 | 6/1968 | Johnsson et al. | 176—30X |
| 3,440,139 | 4/1969 | Lapierre | 176—30 |

CARL D. QUARFORTH, Primary Examiner

G. G. SOLYST, Assistant Examiner

U.S. Cl. X.R.

176—30